United States Patent

Sugio et al.

[11] Patent Number: 4,472,546
[45] Date of Patent: Sep. 18, 1984

[54] POLYPHENYLENE ETHER RESIN COMPOSITION

[75] Inventors: Akitoshi Sugio, Ohmiya; Masanobu Masu, Toyonaka; Masao Okabe, Abiko; Eiji Ukita, Tokyo, all of Japan

[73] Assignee: Mitsubishi Gas Chemical Company, Inc., Tokyo, Japan

[21] Appl. No.: 511,085

[22] Filed: Jul. 5, 1983

[30] Foreign Application Priority Data

Jul. 7, 1982 [JP] Japan ................. 57-118141

[51] Int. Cl.³ ............................ C08K 5/07; C08K 5/27
[52] U.S. Cl. ..................................... 524/91; 524/128; 524/336; 524/337; 524/338
[58] Field of Search ............... 524/91, 128, 336, 337, 524/338

[56] References Cited

U.S. PATENT DOCUMENTS

| | | | |
|---|---|---|---|
| 3,326,849 | 6/1967 | Kelly, Jr. et al. | 524/338 |
| 3,660,531 | 5/1972 | Lauchlan et al. | 525/92 |
| 3,952,072 | 4/1976 | Yonemitsu et al. | 524/128 |
| 3,959,413 | 5/1976 | Schwarzenbach et al. | 524/120 |
| 4,283,327 | 8/1981 | Dexter et al. | 524/91 |
| 4,288,631 | 9/1981 | Ching | 524/337 |

*Primary Examiner*—Lester L. Lee
*Attorney, Agent, or Firm*—Wenderoth, Lind & Ponack

[57] ABSTRACT

A polyphenylene ether resin composition comprising
(A) a polyphenylene ether resin,
(B) at least one compound selected from the group consisting of 2-(o-hydroxyphenyl)benzotriazoles represented by the following formula (I)

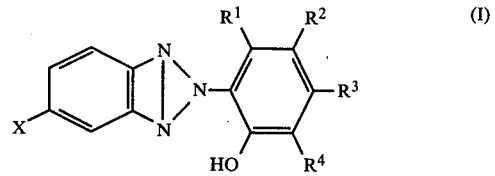

wherein $R^1$, $R^2$, $R^3$ and $R^4$ are identical or different and each represents a hydrogen atom, a halogen atom, a hydroxyl group, an alkyl group, an alkoxy group, an alkoxycarbonylalkyl group, an aryl group or an aralkyl group, and X represents a halogen atom, and 2-hydroxybenzophenones represented by the following formula (II)

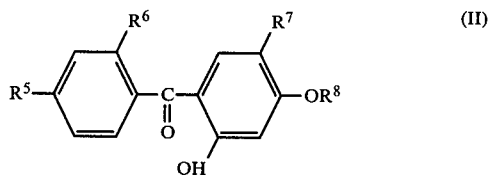

wherein $R^5$ represents a hydrogen atom, a hydroxyl group or an alkoxy group, $R^6$ represents a hydrogen atom or a hydroxyl group, $R^7$ represents a hydrogen atom or a sulfonic acid group, and $R^8$ represents a hydrogen atom, an alkyl group or an aromatic acyl group,
(C) an organic phosphite, and
(D) a sterically hindered phenol.

4 Claims, No Drawings

POLYPHENYLENE ETHER RESIN COMPOSITION

This invention relates to a polyphenylene ether resin composition. More specifically, it relates to a polyphenylene ether resin composition comprising a polyphenylene ether resin, at least one compound selected from the group consisting of 2-(o-hydroxyphenyl)benzotriazoles and 2-hydroxybenzophenones, an organic phosphite and a sterically hindered phenol.

Polyphenylene ether is a known resin disclosed in various known publications, for example U.S. Pat. Nos. 3,306,874, 3,306,875, 3,257,357, 3,257,358 and 4,011,200, and Japanese Laid-Open Patent Publication No. 126800/1975. Since polyphenylene ether generally has a high softening point, it possesses useful properties as a material used in fields which require heat resistance. Because of its high softening point, the polyphenylene ether requires higher temperatures than general-purpose resins during kneading and extrusion for production of resin compositions containing the polyphenylene ether resin. Molding and processing of such polyphenylene ether resin compositions require high temperatures. Frequently, unlike general-purpose resins, molded articles of the polyphenylene ether resin compositions are used for a long period of time at relatively high temperatures. As is well known, the polyphenylene ether is susceptible to oxidation at high temperatures and therefore to degradation during extrusion and molding at high temperatures. The oxidation and degradation may cause deterioration in the properties of resin compositions containing the polyphenylene ether and/or may cause their coloration. Such degradation and/or coloration will limit wide application of resin compositions containing the polyphenylene ether.

When resin compositions containing the polyphenylene ether are used outdoors, their properties are markedly degraded with the lapse of time. To improve the weatherability of the polyphenylene ether is also important to the use of the polyphenylene ether resin composition in a wide range of fields.

Methods have already been proposed to stabilize resin compositions containing the polyphenylene ether. These methods can roughly be divided into two groups. One group is directed to the capping of the hydroxyl groups present at the terminals of the molecules of the polyphenylene ether by acylation, etc., and the other group, to the addition of stabilizers.

Stabilizers for the polyphenylene ether which have heretofore been known include benzoates (see U.S. Pat. No. 3,379,875); hexaalkylphosphoric triamides either alone or with other compounds (see U.S. Pat. Nos. 3,414,536, 3,420,792, 3,429,850, 3,465,062, 3,472,814, 3,483,271, 3,792,121 and 3,816,562); octaalkylpyrophosphoramides either alone or with other compounds (see U.S. Pat. No. 3,450,670); amines (see U.S. Pat. Nos. 3,563,934 and 3,956,423); phosphites and hydrazines (see U.S. Pat. No. 3,639,334); alkanolamines (see U.S. Pat. No. 3,761,541); arylphosphonic diamides (see U.S. Pat. No. 3,792,120); sterically hindered phenols containing a triazine or isocyanuric ring (see U.S. Pat. No. 4,154,719); substituted dicarboxylic acid dihydrazides (see U.S. Pat. No. 3,954,904); high-molecular-weight phosphites either alone or with other compounds (see U.S. Pat. No. 3,952,072); amides (see Japanese Patent Publication No. 29,748/1969); metal salts of dithiocarbamic acid (see Japanese Patent Publications Nos. 19,395/1970 and 8,352/1970); carboxylic acid anhydrides (see Japanese Patent Publication No. 29,750/1969); phosphites (see Japanese Laid-Open Patent Publication No. 29,751/1969); sterically hindered phenols either alone or with other compounds (see Japanese Patent Publications Nos. 43,473/1971. 42,029/1971, 42,030/1971, 42,031/1971, 42,032/1971 and 42,033/1971); sterically hindered phenols having one amide linkage in the molecules (see Japanese Patent Publication No. 24,782/1971); sterically hindered phenols containing one ester linkage in the molecules (see Japanese Patent Publication No. 38,623/1973); high-molecular-weight phosphites (see Japanese Laid-Open Patent Publications Nos. 23,846/1974, 31,755/1974 and 40,476/1975); combinations of phosphorous acid amides with boron compounds (see Japanese Laid-Open Patent Publication No. 129,750/1974); diphosphonites having a specified structure either alone or with sterically hindered phenols (see Japanese Laid-Open Patent Publication No. 125,448/1981); sterically hindered phenols having a specified structure (see Japanese Laid-Open Patent Publication No. 129,249/1981); phosphonic acid or its esters, or combinations of these with sterically hindered phenols (see Japanese Laid-Open Patent Publication No. 145,945/1981); monophosphonous acid and its esters, or combinations of these with sterically hindered phenols (see Japanese Laid-Open Patent Publication No. 3,852/1982); amine derivatives having a specified structure (see Japanese Laid-Open Patent Publication No. 21,455/1982); and metal salts of phosphonic acid either alone or with sterically hindered phenols (see Japanese Laid-Open Patent Publication No. 70,156/1982).

Some suggestions have already been made as to the improvement of the weatherability of polyphenylene ether resin compositions.

International Laid-Open Publication WO81/02021 of International Application PCT/US81/00041 discloses a polyphenylene ether resin containing a piperidine derivative having a specified structural formula or a combination of it with a phosphite, a hydroxybenzotriazole or a sterically hindered phenol. Japanese Laid-Open Patent Publication No. 135159/1980 discloses stabilizers for a polyphenylene ether graft copolymer resin containing an organic phosphite compound and a hydroxybenzotriazole or a hydroxybenzophenone. Japanese Laid-Open Patent Publication No. 100,153/1975 discloses a polyphenylene ether resin containing a hydroxybenzotriazole or a hydrobentozophenone organic nickel complex.

Numerous stabilizers for polyphenylene ether resins and polyphenylene ether resin compositions comprising such stabilizers have been known. It is still desired however to develop a polyphenylene ether resin composition which can find practical application in a wide range of fields by utilizing the high softening point of polyphenylene ether.

It is an object of this invention therefore to provide a polyphenylene ether resin composition of high grade which can find practical applications in a wide range of fields by utilizing the high softening point of polyphenylene ether.

Another object of this invention is to provide a novel polyphenylene ether resin composition having various properties, particularly excellent heat stability which makes the composition withstand use for a long period of time at high temperatures and excellent weatherability which make it withstand outdoor use for a long period of time.

Other objects and advantages of this invention will become apparent from the following description.

According to this invention, the objects of this invention are achieved by a polyphenylene ether resin composition comprising (A) a polyphenylene ether resin, (B) at least one compound selected from the group consisting of 2-(o-hydroxyphenyl)benzotriazoles represented by the following formula (I)

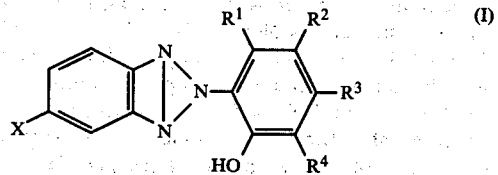

wherein $R^1$, $R^2$, $R^3$ and $R^4$ are identical or different and each represents a hydrogen atom, a halogen atom, a hydroxyl group, an alkyl group, an alkoxy group, an alkoxycarbonylalkyl group, an aryl group or an aralkyl group, and X represents a halogen atom, and 2-hydroxybenzophenones represented by the following formula (II)

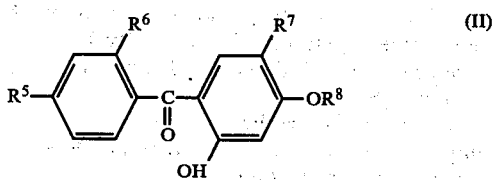

wherein $R^5$ represents a hydrogen atom, a hydroxyl group or an alkoxy group, $R^6$ represents a hydrogen atom or a hydroxyl group, $R^7$ represents a hydrogen atom or a sulfonic acid group, and $R^8$ represents a hydrogen atom, an alkyl group or an aromatic acyl group, (C) an organic phosphite, and (C) an organic phosphite, and (D) a sterically hindered phenol.

The polyphenylene ether resin constituting the resin composition of this invention denotes a polyphenylene ether polymer and a blend of a polyphenylene ether polymer with another resin and/or an elastomer. The polyphenylene ether polymer herein means a homo- or co-polymer of polyphenylene ether, and a graft polymer obtained by grafting an aromatic vinyl compound to such a homo- or copolymer.

Preferably, the homopolymer or copolymer of polyphenylene ether is obtained by polycondensing a monocyclic phenol represented by the following formula

wherein $R^9$ represents a lower alkyl group having 1 to 3 carbon atoms, and $R^{10}$ and $R^{11}$, independently from each other, represent a hydrogen atom or an alkyl group having 1 to 3 carbon atoms.

The homopolymer can be obtained from a single monocyclic phenol, and the copolymer, from two or more monocyclic phenols.

The alkyl group having 1 to 3 carbon atoms in general formula (II) denotes methyl, ethyl, n-propyl and iso-propyl groups.

The alkyl group having 1 to 3 carbon atoms in general formula (II) denotes methyl, ethyl, n-propyl and iso-propyl groups.

Examples of the monocyclic phenol of general formula (II) include 2,6-dimethylphenol, 2,6-diethylphenol, 2,6-dipropylphenol, 2-methyl-6-ethylphenol, 2-methyl-6-propylphenol, 2-ethyl-6-propylphenol, o-cresol, 2,3-dimethylphenol, 2,3-diethylphenol, 2,3-dipropylphenol, 2-methyl-3-ethylphenol, 2-methyl-3-propylphenol, 2-ethyl-3-methylphenol, 2-ethyl-3-propylphenol, 2-propyl-3-methylphenol, 2-propyl-3-ethylphenol, 2,3,6-trimethylphenol, 2,3,6-triethylphenol, 2,3,6-tripropylphenol, 2,6-dimethyl-3-ethylphenol and 2,6-dimethyl-3-propylphenol. Thus, examples of polyphenylene ether resins obtained by polycondensing these monocyclic phenols incude homopolymers such as poly(2,6-dimethyl-1,4-phenylene)ether, poly(2,6-diethyl-1,4-phenylene)ether, poly(2,6-dipropyl-1,4-phenylene)- ether, poly(2-methyl-6-ethyl-1,4-phenylene)ether, poly(2-methyl-6-propyl-1,4-phenylene)ether and poly(2-ethyl-6-propyl-1,4-phenylene)ether, and copolymers such as 2,6-dimethylphenol/2,3,6-trimethylphenol copolymer, 2,6-dimethylphenol/2,3,6-triethylphenol copolymer, 2,6-diethylphenol/2,3,6-trimethylphenol copolymer and 2,6-dipropylphenol/2,3,6-trimethylphenol copolymer.

Of these, poly(2,6-dimethyl-1,4-phenylene)- ether and 2,6-dimethylphenol/2,3,6-trimethylphenol copolymer are preferred.

As the aforesaid graft polymer, preferred is a graft polymer obtained by grafting an aromatic vinyl compound represented by the following formula (IV)

wherein $R^{12}$ represents a hydrogen atom or a lower alkyl group, Z represents a halogen atom or a lower alkyl group, and p is 0 or an integer of 1 to 3, to the homo- or co-polymer of polyphenylene ether. The graft polymer can be produced, for example, by the method described in Japanese Laid-Open Patent Publication No. 126,800/1975. Examples of the aromatic vinyl compound are styrene, alpha-methylstyrene, vinyltoluene, vinylxylene, ethylstyrene, n-propylstyrene, iso-propylstyrene, chlorostyrene and bromostyrene.

Polystyrene-type resins are preferred as the other resin to be blended with the phenylene ether polymer. For example, those which contain at least 25% by weight of structural units of the following formula (V)

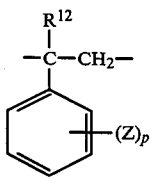

wherein $R^{12}$, Z and P are as defined with regard to formula (IV),
are preferred.

The lower alkyl group in general formula (V) is preferably an alkyl group having 1 to 3 carbon atoms, such as methyl, ethyl, n-propyl and isopropyl.

The halogen atom in general formula (V) is preferably chlorine or bromine.

The structural units of formula (V) are derived from a styrene monomer of the above formula (IV).

Examples of preferred polystyrene-type resins are polystyrene, high-impact polystyrene (rubbermodified polystyrene), styrene/butadiene copolymer, styrene/butadiene/acrylonitrile copolymer, styrene/alpha-methylstyrene copolymer, styrene/acrylic rubber/acrylonitrile copolymer, styrene/alpha-methylstyrene copolymer and styrene/butadiene resinous block copolymer. They may be used either singly or in combination.

Polymers having a Young's modulus at room temperature of $10^5$ to $10^9$ dynes/cm$^2$ (0.1 to 1020 kg/cm$^2$) in accordance with the definition given in A. V. Tobolsky, "Properties and Structures of Polymers" (John Wiley & Sons, Inc., 1960), pages 71 to 78 may be used as the elastomer to be blended with the polyphenylene ether polymer.

Examples of such elastomers include A-B-A' type elastomeric block copolymers (wherein A and A' are blocks resulting from polymerization of an aromatic vinyl compound, and B is a block resulting from polymerization of a conjugated diene), A-B'-A' type elastomeric block copolymers (wherein A and A' are the same as above, and B' is a block resulting from hydrogenation of the block B above), polybutadiene, an elastomeric copolymer of a diene compound and a aromatic vinyl compound, nitrile rubber, ethylene/propylene copolymer, ethylene/propylene/diene copolymer (EPDM), thiokol rubbers, polysulfide rubbers, acrylic rubbers, a grafted product of butyl rubber and polyethylene, polyurethan rubbers, and polyester elastomers. Of these, the A-B-A' type and A-B'-A' elastomeric block copolymers are preferred, and those in which the molecular weight of the block B or B' is higher than the total sum of the molecular weight of the block A and the molecular weight of the block A' are especially preferred. The block A or A' is, for example, a homo-block or co-block resulting from the polymerization of a monocyclic aromatic vinyl compound such as styrene, alpha-methylstyrene, vinyltoluene, vinylxylene or ethylvinylxylene, or a polycyclic aromatic vinyl compound such as vinylnaphthalene, and preferably has a molecular weight of about 2,000 to about 100,000. The block B is, for example, an elastomeric block resulting from the polymerization of a conjugated diene compound such as 1,3-butadiene, 2,3-dimethylbutadiene, isoprene and 1,3-pentadiene. The block B' results from the hydrogenation of the block B. The block B or B' preferably has a molecular weight of about 25,000 to about 1,000,000.

The other resin such as the polystyrene-type resin can be blended in an amount of 5 to 95 parts by weight, preferably 15 to 85 parts by weight, per 100 parts by weight of the polyphenylene ether polymer and the other resin combined. The elastomer can be incorporated in an amount of 5 to 98 parts by weight, preferably 15 to 95 parts by weight, per 100 parts by weight of the polyphenylene ether polymer and the elastomer combined.

The resin composition of this invention contains at least one of the 2-(o-hydroxyphenyl)triazoles and 2-hydroxybenzophenones.

The 2-(o-hydroxyphenyl) triazoles are represented by the following formula (I).

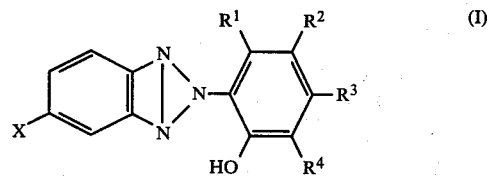

wherein $R^1$, $R^2$, $R^3$ and $R^4$ are identical or different and each represents a hydrogen atom, a halogen atom, a hydroxyl group, an alkyl group, an alkoxy group, an alkoxycarbonylalkyl group, an aryl group or an aralkyl group, and X represents a halogen atom.

The hydroxybenzophenones are represented by the following formula (II).

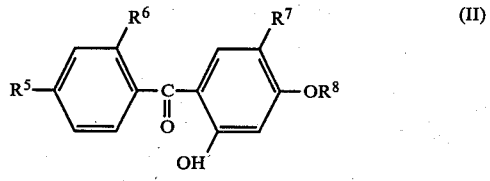

wherein $R^5$ represents a hydrogen atom, a hydroxyl group, or an alkoxy group, $R^6$ represents a hydrogen atom or a hydroxyl group, $R^7$ represents a hydrogen atom or a sulfonic acid group, and $R^8$ represents a hydrogen atom, an alkyl group, or an aromatic acyl group.

With regard to formula (I), the halogen atom is preferably fluorine, chlorine or bromine, especially chlorine. Examples of the preferred alkyl groups are those having 1 to 10 carbon atoms. The alkyl groups may be linear or branched. Specific examples include methyl, ethyl, n-propyl, iso-propyl, n-butyl, iso-butyl, sec-butyl, tert-butyl, n-pentyl, n-hexyl, n-heptyl, n-octyl, n-nonyl and n-decyl. The alkoxy group is preferably a linear or branched alkoxy group having 1 to 10 carbon atoms. Specific examples include methoxy, ethoxy, n-propoxy, iso-propoxy, n-butoxy, n-pentoxy, n-hexoxy, n-heptoxy, n-octoxy, n-nonanoxy, and n-decanoxy. The alkoxycarbonylalkyl group is preferably a ($C_{1-10}$ alkoxy)carbonyl($C_{1-10}$ alkyl) group. A methoxycarbonylethyl group is one example, and other examples will be apparent from the exemplification of the alkoxy and alkyl groups. A phenyl group is preferred as the aryl group, and benzyl, α-phenethyl and β-phenethyl groups are preferred as the aralkyl group.

Specific examples of the 2-(o-hudroxyphenyl)benzotriazole include:

2-(2'-hydroxy-5'-methylphenyl)benzotriazole,
2-(2'-hydroxy-5'-tert-butylphenyl) benzotriazole,
2-(2'-hydroxy-3',5'-di-tert-butylphenyl) benzotriazole,
2-(2'-hydroxy-3-tert-butyl-5'-methylphenyl)-5-chlorobenzotriazole,
2-(2'-hydroxy-3',5'-di-tert-butylphenyl)-5-chlorobenzotriazole,
2-( 2'hydroxy-3',5'-di-tert-amylphenyl)benzotriazole,
2-(2'-hydroxy-4'-octoxyphenyl)benzotriazole,
2-[2'-hydroxy-5'-(1,1,3,3-tetramethylbutyl)phenyl]benzotriazole,
2-(2'-hydroxy-3'-sec-butyl-5'-tert-butylphenyl)benzotriazole,
2-(2'-hydroxy-3'-α-phenethyl-5'-methylphenyl)benzotriazole,
2-(2'-hydroxy-3'-α-phenethyl-5'-methylphenyl)-5-chlorobenzotriazole,
2-(2',4'-dihydroxyphenyl)benzotriazole,
2-(2'-hydroxy-4'-methoxyphenyl)benzotriazole,
2-(2'-hydroxy-4'-octoxyphenyl)benzotriazole,
2-(2'-hydroxy-3'-methyl-5'-methoxycarbonylethylphenyl)benzotriazole,
2-(2'-hydroxy-3',5'-di-tert-amylphenyl)-5-chlorobenzotriazole, and
2-(2'-hydroxy-5'-chlorophenyl)benzotriazole.

In formula (II), $R^5$ represents a hydrogen atom, a hydroxyl group or an alkoxy group. The alkoxy group is preferably an alkoxy group having 1 to 18 carbon atoms. $R^6$ represents a hydrogen atom or a hydroxyl group. $R^7$ represents a hydrogen atom or a sulfonic acid group. $R^8$ represents a hydrogen atom, an alkyl group or an aromatic acyl group. The alkyl group is preferably a linear or branched alkyl group having 1 to 18 carbon atoms. The aromatic acyl group is preferably a benzoyloxy group, a naphthoyloxy group, etc.

Specific examples of the hydroxybenzophenones of formula (II) include
2,4-dihydroxybenzophenone,
2-hydroxy-4-methoxybenzophenone,
2-hydroxy-4-octoxybenzophenone,
2-hydroxy-4-dodecyloxybenzophenone,
2,2'-dihydroxy-4-methoxybenzophenone,
2,2'-dihydroxy-4,4'-dimethoxybenzophenone,
2-hydroxy-4-methoxy-5-sulfobenzophenone,
2-hydroxy-4-decyloxy-benzophenone,
2-hydroxy-4-benzoyloxybenzophenone,
2,4,4'-trihydroxybenzophenone, and
2,2'-dihydroxy-4,4'-methoxybenzophenone.

At least one of the 2-(o-hydroxyphenyl)benzotriazoles of formula (I) and the 2hydroxybenzophones of formula (II) is used in this invention.

The organic phosphite (C) contained in the resin composition of this invention includes organic phosphites and organic thiophosphites.

These organic phosphites are represented, for example, by the following formula (VI)

$$(R-X)_3P \qquad (VI)$$

wherein the R groups are identical or different and each represents an alkyl group, preferably an alkyl group having 2 to 18 carbon atoms, an aryl group, preferably a phenyl group, or a phenyl group substituted by an alkyl group having 1 to 10 carbon atoms and X represents an oxygen atom or a sulfur atom.

Specific examples of the organic phosphites include triphenyl phosphite, tricresyl phosphite, triisooctyl phosphite, tridecyl phosphite, tri-2-ethylhexyl phosphite, trioctadecyl phosphite, tri(octylphenyl) phosphite, tri(nonylphenyl) phosphite, tridodecyl thiophosphite, phenyldiethyl phosphite, phenyl-di(2-ethylhexyl) phosphite, isooctyldiphenyl phosphite, diisooctylmonophenyl phosphite, and di(2-ethylhexyl)-mono(isooctylphenyl) phosphite. Distearylpentaerythritol diphosphite, and hydrogenated bisphenol A phosphite resin can also be preferably used as the organic phosphites. The hydrogenated bisphenol A phosphite resin is especially preferred as the organic phosphite (C).

Examples of the sterically hindered phenol (D) which is used in this invention include monohydric phenols such as 2,6-di-tert-butyl-p-cresol, 2-tert-butyl-4-methoxyphenol, 2,4-dinonylphenol, octadecyl-3-(3,5-di-tert-butyl-4-hydroxyphenyl)propionate, diethyl 3,5-di-tert-butyl-4-hydroxybenzylphosphonate, or 2-(3',5'-di-tert-butyl-4'-hydroxyanilino)-4,6-dioctylthio-1,3,5-triazine; dihydric phenols such as 2,2'-methylenebis(4-methyl-6-tertbutylphenol), 2,2'-methylenebis(4-ethyl-6-tert-butylphenol), butylidenebis(methyl-butylphenol), 4,4'-thiobis(6-tert-butyl-3-methylphenol), 1,1-bis(4-hydroxyphenyl)cyclohexane, 1,6-hexanediol-bis-3-(3,5-di-tert-butyl-4-hydroxyphenyl)propionate, 2,2'-thiodiethyl-bis[3-(3,5-di-tert-butyl-4-hydroxyphenyl)propionate] or N,N'-hexamethylenebis(3,5-di-tert-butyl-4-hydroxyhydrocinnamide); trihydric phenols such as 1,3,5-tris(4-tert-butyl-3-hydroxy-2,6-dimethylbenzyl)isocyanuric acid, 2,4,6-tris(3',5'-di-tert-butyl-4'-hydroxybenzyl)-1,3,5-triazine, an ester of 3,5-di-tert-butyl-4-hydroxyhydrocinnamic acid with 1,3,5-tris(2-hydroxyethyl-S-triazine-2,4,6(1H, 3H,5H)trione), or 1,1,3-tris(2'-methyl-4'-hydroxy-5'-tert-butylphenyl)butane; and tetrahydric phenols such as pentaerythrityl-tetrakis[3-(3,5-di-tert-butyl-4-hydroxyphenyl)propionate].

These hindered phenols may be used singly or in combination with each other.

The resin composition comprises the polyphenylene ether resin (A) and amounts effective for imparting heat stability and/or weatherability of (B) at least one of the 2-(o-hydroxyphenyl)benzotriazole of formula (I) and the 2-hydroxybenzophenones of formula (II), (C) the organic phosphite and (D) the sterically hindered phenol.

Each of the compounds (B), (C) and (D) is used in an amount of usually 0.01 to 5 parts by weight, preferably 0.05 to 3 parts by weight, more preferably 0.1 to 2 parts by weight, per 100 parts by weight of the polyphenylene ether resin.

Even when each of these compounds is used in amounts exceeding the above-specified upper limits, no further appreciable improvement in the heat stability and weatherability of the resin composition can be obtained, and rather the increased amounts may adversely affect the properties of the resin composition, such as a decrease in its heat distortion temperature. On the other hand, when these additives are used in amounts below the specified lower limits, the effects of these additives are not as great as expected.

By the synergistic actions of the compounds (B), (C) and (D), the resin composition of this invention shows excellent heat stability and weatherability.

As required, the resin composition of this invention may further contain various additives, fillers, etc.

Examples of such additives include lubricants such as polyolefin waxes (e.g., polyethylene wax or polyproylene wax); organic phosphate-type fire-retarting plasticizers such as triphenyl phosphate, tricresyl phosphate or a phosphate obtained from a mixture of isopropylphenol and phenol; bromine-type fire retardants such as decabromobiphenyl, pentabromotoluene and decabromobiphenyl ether; and pigments such as titanium dioxide, zinc sulfide or zinc oxide.

Examples of the fillers are inorganic fillers typified by glass fibers, asbestos and flakes of wollastonite, mica, talc, copper, aluminum or nickel; and organic fillers typified by carbon fibers.

These fillers and additives may be used in amounts which do not reduce the heat resistance of the resin composition.

The following examples illustrate the resin composition of this invention more specifically. Unless otherwise specified all parts and percentages in these examples are by weight.

EXAMPLES 1 AND COMPARATIVE EXAMPLES 1 AND 2

Sixty parts by weight of a 2,6-dimethylphenol (95 mole %)/2,3,6-trimethylphenol (5 mole %) copolymer having an intrinsic viscosity, measured at 25° C. in chloroform, of 0.52 dl/g, 37 parts by weight of highimpact polystyrene (the intrinsic viscosity of the polystyrene matrix measured at 25° C. in chloroform solvent, 0.89 dl/g; gel content determined by using methyl ethyl ketone as a solvent, 12.9%), 2 parts of a polystyrene-polybutadiene-polystyrene block copolymer (the weight ratio of the polystyrene block to the polybutadiene block, 30:70; viscosity measured at 25° C. for its 20% toluene solution by a Brookfield Model RVT Viscometer, 1500 cps), 1 part of an ethylene/propylene copolymer (reduced specific viscosity measured at 135° C. using decalin as a solvent in a concentration of 0.1 g/100 ml, 2.0; glass transition point, -49° C.), 6 parts of tribphenyl phosphate, 2 parts of titanium dioxide, 0.4 part of hydrogenated bisphenol A phosphite resin, 0.6 part of 2,2'-methylenebis(4-methyl-6-tert-butylphenol) and 0.1 part of 2-(2'-hydroxy-3'-tert-butyl-5'-methylphenyl)-5-chlorobenzotriazole were thoroughly mixed by a Henschel mixer. The resulting mixture was pelletized by a twin-screw extruder (Model AS-30 manufactured by Nakatani Machinery Co., Ltd.) in which the cylinders were maintained at a maximum temperature of 290° C. Then, the pellets were injection molded under an injection pressure of 1050 kg/cm$^2$ by an injection molding machine (Model SJ-35B manufactured by Meiki Co., Ltd.) in which the cylinder was maintained at a maximum temperature of 280° C. to prepare test specimens (for the measurement of tensile impact strength). The test specimens obtained were maintained for 10 days in a hot air circulating oven kept at 115° C. to heat-age them. Separately, the test specimens were subjected to an exposure test for 100 hours using a Sunshine Wether-O-Meter in order to examine their weatherability.

The above procedure was repeated except that the hydrogenated bisphenol A phosphite resin, 2,2'-methylenebis(4-methyl-6-tert-butylphenol) and 2-(2'-hydroxy-3'-tert-butyl-5'-methylphenyl)-5-chlorobenzotriazole were not used (Comparative Example 1).

The above procedure was repeated except that 0.44 part of the hydrogenated bisphenol A phosphite resin and 0.66 part of 2,2'-methylenebis(4-methyl-6-tert-butylphenol) were used, and 2-(2'-hydroxy-3'-tert-butyl-5'-methylphenyl)-5-chlorobenzotriazole was not used (Comparative Example 2).

The tensile impact strengths of the test specimens before and after the tests are shown in Table 1.

TABLE 1

| | Tensile impact strength (kg · cm/cm$^2$) | | |
|---|---|---|---|
| | Before testing | After heat-aging | After exposure |
| Example 1 | 142 | 105 (74%) | 64 (45%) |
| Comparative Example 1 | 160 | 60 (38%) | 66 (41%) |
| Comparative Example 2 | 145 | 94 (65%) | 61 (42%) |

(Note):
The parenthesized figures in % are percent retentions which are calculated in accordance with the following equation.

Percent retention (%) = $\frac{\text{Value after testing}}{\text{Value before testing}} \times 100$ It is seen from the results given in Table 1 that the resin composition of this invention has improved heat resistance and weatherability.

EXAMPLE 2 AND COMPARATIVE EXAMPLE 3

Example 1 was repeated except that 0.3 part of 2-(2'-hydroxy-5'-tert-octylphenyl)benzotriazole was used instead of 0.1 part of 2-(2'-hydroxy-3'-tert-butyl-5'-methylphenyl)-5-chlorobenzotriazole.

Example 2 was repeated except that 0.52 part of the hydrogenated bisphenol A phosphite resin and 0.78 part of 2,2'-methylene-bis(4-methyl-6-tert-butylphenol) were used, and 2-(2'-hydroxy-5'-tert-octylphenyl)benzotriazole was not used (Comparative Example 3).

The results are shown in Table 2.

TABLE 2

| | Tensile impact strength (kg · cm/cm$^2$) | | |
|---|---|---|---|
| | Before testing | After heat-aging | After exposure |
| Example 2 | 142 | 108 (76%) | 77 (54%) |
| Comparative Example 3 | 148 | 101 (68%) | 66 (45%) |

EXAMPLE 3

Example 1 was repeated except that 0.3 part of 2-(2'-hydroxy-5'-octyloxyphenyl)benzotriazole was used instead of 0.1 part of 2-(2'-hydroxy-3'-tert-butyl-5'-methylphenyl)-5-chlorobenzotriazole.

The results are shown in Table 3.

TABLE 3

| | Tensile impact strength (kg · cm/cm$^2$) | | |
|---|---|---|---|
| | Before testing | After heat-aging | After exposure |
| Example 3 | 141 | 110 (78%) | 74 (52%) |

EXAMPLES 4 AND 5

Example 1 was repeated except that 0.3 part of 2-hydroxy-4-octoxybenzophenone (Example 4), or 0.5 part of 2-(2'-hydroxy-3',5'-di-tert-butylphenyl)-5-chlorobenzotriazole (Example 5) was used instead of 0.1 part of 2-(2'-hydroxy-3'-tert-butyl-5'-methylphenyl)-5-chlorobenzotriazole.

The results are shown in Table 4.

TABLE 4

| | Tensile impact strength (kg · cm/cm²) | | |
|---|---|---|---|
| | Before testing | After heat-aging | After exposure |
| Example 4 | 136 | 105 (77%) | 72 (53%) |
| Example 5 | 140 | 110 (79%) | 78 (56%) |

EXAMPLE 6

Example 1 was repeated except that the amount of titanium dioxide was changed to 1 part, and the amount of 2-(2'-hydroxy-3',5'-di-tert-butylphenyl)-5-chlorobenzotriazole was changed to 1 part. The results are shown in Table 5.

TABLE 5

| | Tensile impact strength (kg · cm/cm²) | | |
|---|---|---|---|
| | Before testing | After heat-aging | After exposure |
| Example 6 | 132 | 106 (80%) | 70 (53%) |

EXAMPLE 7

Forty-three parts of a 2,6-dimethylphenol (95 mole %)/2,3,6-trimethylphenol (5 mole %) copolymer having an intrinsic viscosity measured at 25° C. in chloroform of 0.54 dl/g, 54 parts of the same highimpact polystyrene as used in Example 1, the same polystyrene-polybutadiene- polystyrene block copolymer as used in Example 1, 1 part of the same ethylene-propylene copolymer as used in Example 1, 1 part of titanium dioxide, 8 parts of triphenyl phosphate, 0.34 part of tris-(nonylphenyl) phosphite, 0.52 part of 2,6-di-tert-butyl-p-cresol and 1 part of 2-(2'-hydroxy-3',5'-di-tert-butylphenyl)-5-chlorobenzotriazole were thoroughly mixed by a Henschel mixer. The resulting mixture was pelletized by a twin-screw extruder (Model AS-30) in which the cylinders were set at a maximum temperature of 290° C. and the pellets were molded under an injecting pressure of 1050 kg/cm² by an injection molding machine (Model SJ-35B) in which the cylinder was set at a maxmimum temperature of 250° C. to prepare test specimens for the measurement of tensile impact strength. The test specimens were heat-aged for 10 days in a hot air circulating oven maintained at 95° C. Separately, the specimens were subjected to an exposure test for 100 hours using a Sunshine Weather-O-Meter.

The tensile impact strengths of the test specimens before and after the tests are shown in Table 6.

TABLE 6

| | Tensile impact strength (kg · cm/cm²) | | |
|---|---|---|---|
| | Before testing | After heat-aging | After exposure |
| Example 7 | 98 | 92 (94%) | 68 (69%) |

What is claimed is:

1. A polyphenylene ether resin composition comprising
   (A) a polyphenylene ether resin,
   (B) at least one compound selected from the group consisting of 2-(o-hydroxyphenyl)benzotriazoles represented by the following formula (I)

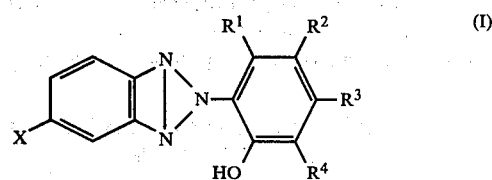

wherein $R^1$, $R^2$, $R^3$ and $R^4$ are identical or different and each represents a hydrogen atom, a halogen atom, a hydroxyl group, an alkyl group having 1 to 4 carbon atoms, an alkoxy group, an alkoxycarbonylalkyl group, an aryl group or an aralkyl group, and X represents a halogen atom,
   and 2-hydroxybenzophenones represented by the following formula (II)

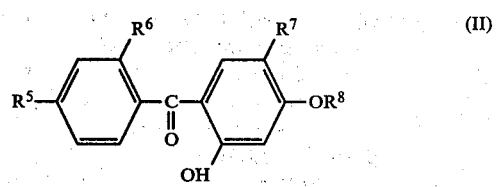

wherein $R^5$ represents a hydrogen atom, a hydroxyl group or an alkoxy group, $R^6$ represents a hydrogen atom or a hydroxyl group, $R^7$ represents a hydrogen atom or a sulfonic acid group, and $R^8$ represents a hydrogen atom, an alkyl group or an aromatic acyl group,
   (C) an organic phosphite, and
   (D) a sterically hindered phenol, the amount of each of the compound (B), the organic phosphite (C) and the sterically hindered phenol (D) being 0.01 to 5 parts by weight per 100 parts by weight of the polyphenylene ether resin.

2. The resin composition of claim 1 wherein the polyphenylene ether resin is a homopolymer of phenylene ether, a copolymer of phenylene ether, a grafted phenylene ether polymer, or a blend of any one of these polymers with another resin or an elastomer.

3. The resin composition of claim 2 wherein the other resin is a polystyrene-type resin.

4. The resin composition of claim 2 wherein the elastomer has a Young's modulus at room temperature of $10^5$ to $10^9$ dynes/cm².

* * * * *